United States Patent [19]
Jang et al.

[11] Patent Number: 5,658,218
[45] Date of Patent: Aug. 19, 1997

[54] HYDRAULIC CONTROL SYSTEM OF AN AUTOMATIC TRANSMISSION USED IN A VEHICLE

[75] Inventors: Jaeduk Jang; Kibeen Lim, both of Kyungki-do, Rep. of Korea

[73] Assignee: Hyundai Motor Co., Seoul, Rep. of Korea

[21] Appl. No.: 550,942

[22] Filed: Oct. 31, 1995

[30] Foreign Application Priority Data

| Nov. 1, 1994 | [KR] | Rep. of Korea | 94-28504 |
| Nov. 9, 1994 | [KR] | Rep. of Korea | 94-29313 |
| Nov. 9, 1994 | [KR] | Rep. of Korea | 94-29319 |

[51] Int. Cl.$^6$ ........................ F16H 61/00
[52] U.S. Cl. .............. 477/117; 477/130; 477/158
[58] Field of Search ....................... 477/117, 127, 477/130, 131, 156, 158

[56] References Cited

U.S. PATENT DOCUMENTS

| 3,978,743 | 9/1976 | Murakami | 477/127 X |
| 4,580,466 | 4/1986 | Iwanaga | 477/127 X |
| 5,090,270 | 2/1992 | Suzuki | 477/117 |
| 5,230,256 | 7/1993 | Oizumi et al. | 477/127 |
| 5,269,203 | 12/1993 | Ueda | 477/131 |
| 5,277,287 | 1/1994 | Ishii et al. | 477/169 X |
| 5,293,789 | 3/1994 | Goto et al. | 477/151 |
| 5,323,668 | 6/1994 | Nakagawa et al. | 477/158 X |
| 5,385,511 | 1/1995 | Iizuka | 477/117 X |
| 5,399,131 | 3/1995 | Kamada et al. | 477/150 |
| 5,400,678 | 3/1995 | Jain et al. | 477/127 X |
| 5,417,626 | 5/1995 | Gierer | 477/117 |
| 5,439,427 | 8/1995 | Enokido et al. | 477/130 |
| 5,498,217 | 3/1996 | Maruyama et al. | 477/169 |
| 5,537,887 | 7/1996 | Jang et al. | 477/131 X |

OTHER PUBLICATIONS

U.S. Patent Application Serial No. 08/347,312.

*Primary Examiner*—Charles A. Marmor
*Assistant Examiner*—Peter T. Kwon
*Attorney, Agent, or Firm*—Finnegan, Henderson Farabow, Garrett Dunner

[57] ABSTRACT

Disclosed is a hydraulic control system of an automatic transmission used in a vehicle, which comprises a torque converter for transferring the engine power to the input shaft of the transmission, an oil pump for pumping an oil by means of the engine power, a pressure regulation means for regulating the line pressure produced by the oil pump according to the forward and reverse drive and the amount of a throttle opening, a damper clutch working control means for changing the direction of the pressure delivered to the torque converter in order to increase the power transfer rate of the torque converter, a shift pressure control means for delivering the pressure supplied from the pressure regulation means to the first, second, third, fourth, fifth, sixth and seventh solenoid valves controlled on/off by a transmission control unit to adjust the control pressure during shifting operation, and a pressure distribution means for selectively distributing the pressure supplied from the pressure control means during shifting among the friction elements according to the shifting stages.

13 Claims, 11 Drawing Sheets

HYDRAULIC CONTROL SYSTEM OF AN AUTOMATIC TRANSMISSION USED IN A VEHICLE

BACKGROUND OF THE INVENTION

(1) Field of the Invention

The present invention concerns a system for controlling hydraulic pressure in an automatic four-speed transmission, and more specifically a means for stabilizing line pressure and control pressure as well as reducing the shifting shock when making a gear shift from the neutral mode to the forward or reverse drive mode.

(2) Description of the Prior Art

The automatic transmission comprises a torque converter, multi-stage gear shift mechanism connected with the torque converter, and a plurality of friction elements for selecting one of the gear shift stages. The friction elements are worked through a plurality of control valves for controlling the hydraulic pressure applied by the hydraulic control system.

Such a hydraulic control system comprises a pressure regulating means for regulating the hydraulic pressure produced by an oil pump, manual and automatic transmission control means for selecting one of the shift modes, pressure control means for controlling the shifting sense and responsiveness to make a gear shift smooth, damper clutch control means for working the damper clutch of the torque converter, and pressure distribution means for distributing properly the hydraulic pressure among the friction elements. The pressure control means controls the pressures applied to the friction elements, torque converter, solenoid valves, etc., which substantially affects the shifting sense.

When performing the shift operation, it is preferable to supply controlled hydraulic pressures to the friction elements while completing the shift operation with the drive pressure. Such transmission control means is disclosed in U.S. patent application Ser. No. 08/347,312 filed by the present applicant, which suffers the shift shock caused by the drive pressure or the backward pressure applied to the friction elements in the manual shifting when making the forward or the backward movement.

SUMMARY OF THE INVENTION

It is an object of the present invention to provide a control means for reducing the shifting shocks when changing the mode from the neutral to the forward or reverse drive.

According to the present invention, a hydraulic control system of an automatic transmission used in a vehicle, comprises:

a torque converter for transferring the engine power to the input shaft of the transmission;

an oil pump for pumping an oil by means of the engine power;

a pressure regulation means for regulating the line pressure produced by the oil pump according to the forward and reverse drive and the amount of a throttle opening;

a damper clutch working control means for changing the direction of the pressure delivered to the torque converter in order to increase the power transfer rate of the torque converter;

a shift pressure control means for delivering the pressure supplied from the pressure regulation means to the first, second, third, fourth, fifth, sixth and seventh solenoid valves controlled on/off by a transmission control unit to adjust the control pressure during shifting operation; and a pressure distribution means for selectively distributing the pressure supplied from the pressure control means during shifting among the friction elements according to the shifting stages.

The pressure regulation means comprises a pressure regulation valve having a first port for receiving the hydraulic pressure from the oil pump, a second port for delivering the regulated pressure to a manual valve, a third port for discharging the pressure received through the first port for pressure regulation, a fourth port for forming or releasing the pressure according to the amount of the throttle opening on the forward drive, a fifth port for receiving a reverse drive pressure, a sixth port for delivering a pressure in opposition to the pressures supplied through the fourth and fifth ports, and a seventh port for delivering the regulated pressure to the damper clutch operation control means, and a high line signal pressure valve having a first port for receiving the pressure of the pressure control means, a second port for receiving the line pressure, a third port for forming or releasing the pressure under the control of the fifth solenoid valve, and a fourth port for delivering a control pressure to the fourth port of the pressure regulation valve.

The damper clutch operation control means comprises a converter control pressure signal valve having a first port for receiving the pressure of the pressure control means when carrying out the shifting operation, a second port for forming or releasing the pressure by means of the fourth solenoid valve turned on/off in the region of the damper clutch operation/non-operation, a third port for receiving the control pressure of the damper clutch, and a fourth port for delivering or blocking the control pressure, and a converter control valve having a first port for receiving the damper clutch working or releasing pressure, a second port for delivering the pressure of the first port to the line part of the damper clutch working side, a third port for delivering the pressure of the first port to the line part of the damper clutch releasing side, and a fourth port for receiving the control pressure from the converter control pressure signal valve.

The shift pressure control means comprises an N-D valve for delivering to the friction elements the torque pressure subject to the duty control by the seventh solenoid valve on changing the mode from the neutral range to the forward range, and a reverse torque control valve subject to the duty control by the seventh solenoid valve on changing the mode from the neutral range to the reverse range.

The pressure distribution means comprises a plurality of shift valves each having two ports for selectively receiving one of two kinds of torque pressure from the shift pressure control means, and a port for receiving a drive pressure, and a port for sequentially delivering the drive pressure and the torque pressure flowing into one of the two ports for receiving the torque pressures.

The N-D valve have a port for receiving the torque pressure, a port for sequentially delivering the torque pressure and the drive pressure to the friction elements, and a line pressure port for controlling the valve spool so as to make the torque and drive pressures be sequentially delivered.

The plurality of shift valves include a first-to-second shift valve, a second-to-third shift valve, a third-to-fourth shift valve, and a fourth-to-fifth shift valve, the first-to-second and second-to-third shift valve making a port change to replace the torque pressure by the drive pressure on the first solenoid valve being turned off, the third-to-fourth shift valve making a port change to replace the torque pressure by the drive pressure on the second solenoid valve being turned on, and the fourth-to-fifth shift valve making a port change to replace the torque pressure by the drive pressure on the third solenoid valve be turned on.

The first-to-second shift valve has a valve spool with a first and a second land at both ends, the first and second lands having a pressure applied area greater than any other lands.

The shift valves respectively communicate with a 2ND clutch valve, a 3RD clutch valve, a fourth band valve, and a overdrive unit valve.

The present invention will now be described more specifically with reference to the drawings attached only by way of example.

DETAILED DESCRIPTION OF THE PREFERRED EMBODIMENTS

Figure 1:
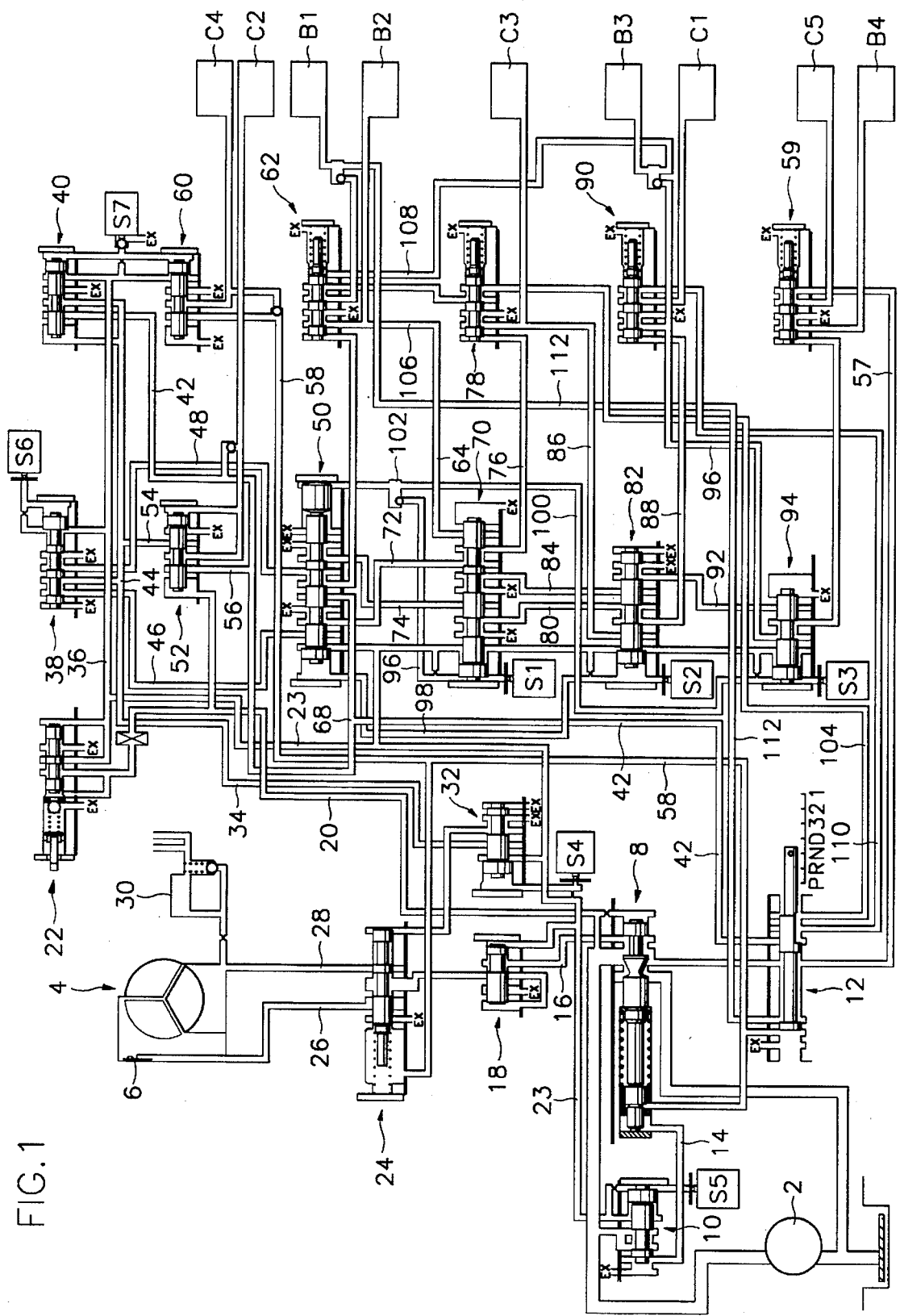
FIG. 1 is a schematic diagram for illustrating the circuit of a hydraulic control system according to an embodiment of the present invention.
Figure 2:
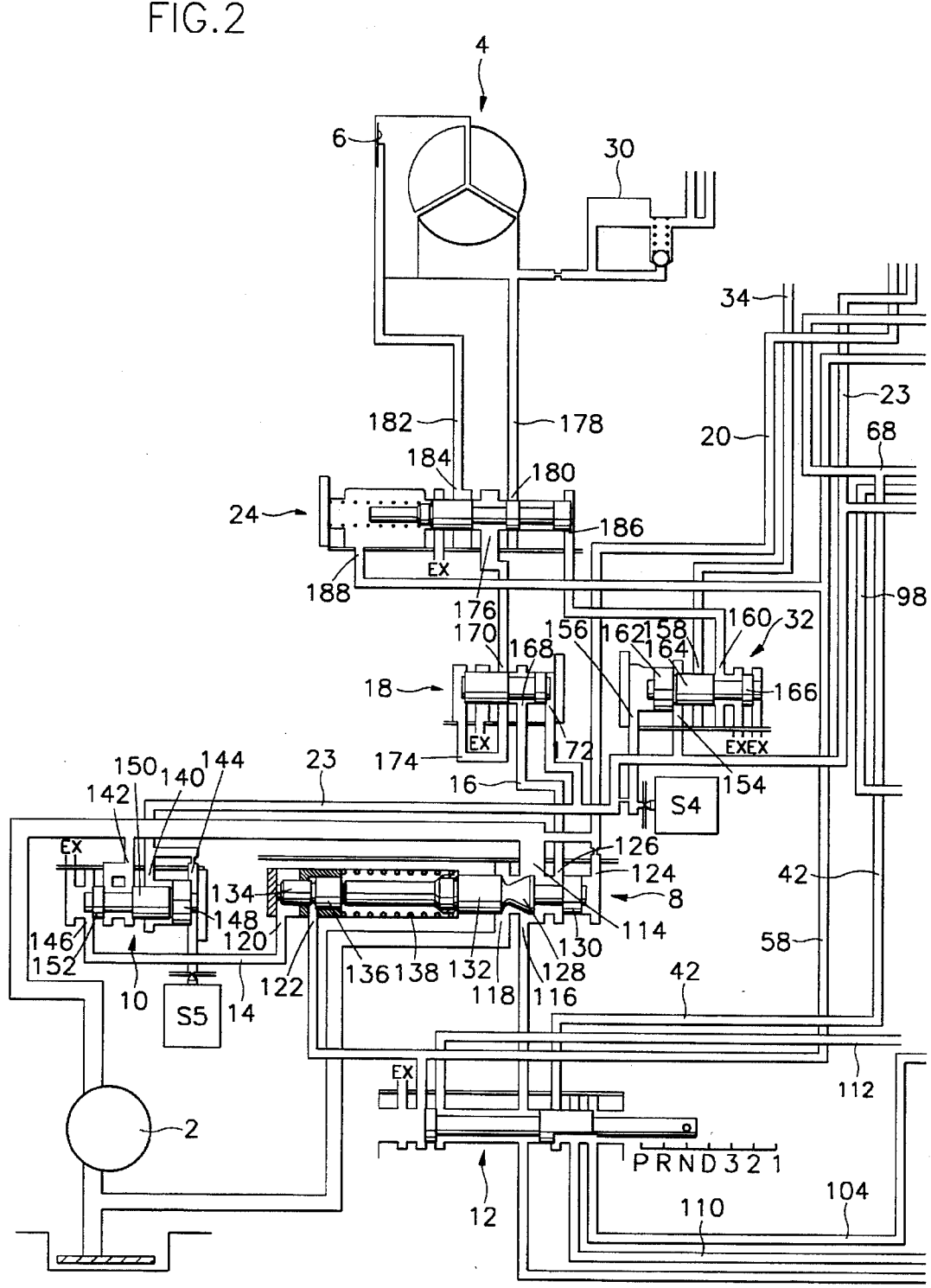
FIG. 2 is an enlarged circuit diagram for showing the pressure regulation means and the damper clutch operation control means of FIG. 1.

Referring to FIGS. 1 and 2, there are shown an oil pump 2 for pumping an oil by means of the power of an engine, a torque converter 4 for delivering the power of the engine to the input shaft of an automatic transmission, a damper clutch 6 provided in the torque converter for increasing power transfer ratio, and a pressure regulation valve 8 for modifying the hydraulic pressure generated by the oil pump according to the drive condition of a vehicle. The pressure regulation valve 8 regulates the line pressure by means of a line signal valve 10 in the forward speeds, and by means of the reverse drive pressure supplied by a manual valve 12 in the reverse speed. To this end, the pressure regulation valve 8 is connected with the signal valve 10 via a line part 14 in order to receive a control pressure. The line pressure regulated by the pressure regulation valve 8 is applied to a converter feed valve 18 through a line part 16, and to a solenoid supply valve 22 through a line part 20. The high line signal valve 10 is connected with a line part 23 for receiving the hydraulic pressure adjusted by the solenoid supply valve 22.

The converter feed valve 18 is to deliver the regulated hydraulic pressure via the converter control valve 24 to the torque converter 4. The converter control valve 24 selectively flows the hydraulic pressure of the converter feed valve 18 to a line part 26 or 28 so as to make a damper clutch 6 active or inactive. The pressurized oil through the line part 28 is also supplied via a cooler 30 to each of the elements to be lubricated.

The converter control valve 24 is controlled by a converter control pressure signal valve 32, which causes the torque pressure of a line part 34 to be supplied to the torque control valve 24 or not under the control of the hydraulic pressure of the line part 23. The torque pressure of the line part 44 is controlled by a control switch valve 38, selectively supplied to a first or a second torque pressure line part 46 or 48, which supply the torque pressure to a first-to-second shift valve 50 to perform an automatic gear shift.

When the gear shift lever is moved from the neutral range N to forward drive range D to perform the gear shift, there occurs the shifting shock caused by the gear shift, which can be reduced by an N-D control valve 52 provided between the line parts 36 and 42 according to the present invention. The N-D control valve 52 receives the control pressure through the line part 20 on the one hand. Additionally connected is a branch line 54 to the line part 44 supplying the torque pressure to a torque control regulation valve 40, through which branch line 54 may be delivered the torque pressure to the N-D control valve 52. Moreover, a drive pressure branch line 56 from the line part 42 is connected with the N-D control valve 52 to deliver the drive pressure of the line part 42 directly to a first friction element C2. Meanwhile, the manual valve 12 is connected via a line part 57 with a overdrive unit valve 59 to deliver the line pressure directly to a second friction element C5.

When the gear shift lever changes the position to the reverse drive range R, the manual valve 12 is connected via a line part 58 with a reverse torque control regulation valve 60 to deliver the reverse drive pressure to a reverse friction element C4. The reverse torque control regulation valve 60 is designed to directly receive the control pressure of the torque control regulation valve 40.

The first-to-second shift valve 50 is to deliver a part of the torque pressure directly to a third friction element B3 via 2ND clutch valve 62, and a part of the torque pressure to a second-to-third shift valve 70 via a line part 64. Such torque pressure can be replaced by the drive pressure in the first-to-second shift valve 50 because the line part 42 containing the drive pressure is connected via a drive pressure branch line 68 with the first-to-second shift valve 50, which may change the port by means of a first solenoid valve S1 controlled on/off by a transmission control unit (not shown). When performing the replacement, the torque pressure of the first-to-second shift valve 50 may be transferred via line parts 72, 74 to the second-to-third shift valve 70.

In this case, one of the torque pressures is delivered from the second-to-third shift valve 70 via a line part 76 to 3RD clutch valve 78, and the other torque pressure via a line part 80 to a third-to-fourth shift valve 82. When the torque pressure of the line part 76 is replaced by the drive pressure, the torque pressure having been delivered to the 3RD clutch valve 78 is delivered via a line part 84 to the third-to-fourth shift valve 82. The torque or drive pressure delivered to the 3RD clutch valve 78 is partly delivered via a line part 86 to a fourth friction element C3, and partly to the third-to-fourth shift valve 82.

The third-to-fourth shift valve 82 is designed to deliver via a line part 88 the pressures received via line parts 80, 86 to 4TH band valve 90, and via a line part 92 the pressure received via a line part 84 to a fourth-to-fifth shift valve 94. The pressure delivered to the 4TH band valve 90 is partly delivered directly to a fifth friction element C1 and partly to the fourth-to-fifth shift valve 94 via a line part 96. The fourth-to-fifth shift valve 94 delivers the pressure to the sixth friction element B4 via the overdrive unit valve 59.

The first-to-second, second-to-third, third-to-fourth, fourth-to-fifth shift valves 50, 70, 82, 94 make the port change to select the torque or drive pressure under the control of the first, second and third solenoid valves S1, S2, S3. Namely, the first, second and third solenoid valves serve to discharge the hydraulic pressure delivered by a solenoid supply valve 22 or to apply the hydraulic pressure to the largest land of each shift valve so as to move the valve spool left or right. To this end, the first-to-second shift valve 50 and the second-to-third shift valve 70 are connected by means of a line part 96, and the first-to-second shift valve 50 and the third-to-fourth shift valve 82 by means of a line part 98. Moreover, the first-to-second shift valve 50 and the fourth-to-fifth shift valve 94 are connected by means of a line part 100, which is provided with a shuttle valve 102 to block the passage from the line part 96 or the line part 100.

In order to make manual shifting, the manual valve 12 is connected with the 3RD clutch valve 78 via the second speed line part 104, of which the hydraulic pressure is delivered via a line part 106 to the 2ND clutch valve 62, which makes the port change to deliver the pressure to the fifth friction element B3 via a line part 108. Additionally, the third speed pressure line part 110 is connected with the 4TH band valve 90 to deliver the pressure to a seventh friction element C1. In order to have the reverse controlling, another reverse friction element B1 is connected with the manual valve 12 via a reverse line part 112.

As shown in FIG. 2, the pressure regulation valve 8 includes a first port 114 for receiving the hydraulic pressure of the oil pump 2, a second port 116 for delivering the regulated hydraulic pressure to the manual valve 12, and a third port 118 for returning the discharged hydraulic pressure upon adjusting the line pressure. It also have a fourth port 120 for receiving the hydraulic pressure of the line part 14, a fifth port 122 for directly receiving the hydraulic pressure from the manual valve 12 to adjust the line pressure upon the backward movement, a sixth port 124 for receiving the control pressure against the hydraulic pressure applied to the third and fourth ports 120 and 122, and a seventh port 126 for delivering the regulated pressure to the converter feed valve 18.

The valve spool of the pressure regulation valve 8 has a first land 128 with an inclined surface for passing the hydraulic pressure received through the first port 114 to the second port 116, a second land 130 for receiving the hydraulic pressure of the sixth port 124, and a third land 132 for blocking the third port 118. Additionally, the valve spool has a fourth land 134 for receiving the pressure of the fourth port 120, and a fifth land 136 for receiving the reverse control pressure of the fifth port 122, where the area of the fifth land 136 for receiving the hydraulic pressure is greater than that of the fourth land 134. The third land 132 is normally positioned in the right side by the resilient force of a spring applied to the valve spool.

The pressure regulation valve 8 performs the pressure regulation by means of the high line signal pressure valve 10, which has a first port 140 for receiving a reduced hydraulic pressure delivered from the solenoid supply valve 22, and a second port 142 for receiving directly from the oil pump 2. The hydraulic pressure delivered to the first port 140 is also partly delivered to a third port 144 as a control pressure, which is formed or released by a fifth solenoid valve S5. The pressure delivered through the second port 142 is used to make the port change of the pressure regulation valve 8 in cooperation with a fourth port 146 communicating with the line part 14. The valve spool of the high line signal pressure valve 10 has a first land 148 with the left side receiving the pressure of the first port 140 and the right side receiving the pressure of the third port 144, a second land 150 with a pressure applied area smaller than the first land, and a third land 152 with the same pressure applied area as the second land and for blocking the pressure flow of the second port 142 to the fourth port 146.

The converter control pressure signal valve 32 has a first port 154 for receiving the control pressure of the line part 23 from the solenoid supply valve 22, and a second port 156. The pressure of the second port 156 is formed or released by means of a fourth solenoid valve S4, whereby the torque pressure of the line part 34 flowing to a third port 158 is delivered via a fourth port 160 to the converter control valve 24 or not. The valve spool of the converter control pressure signal valve 32 has a first land 162 for receiving the pressure of the second port 156, a second land 164 for closing the third port 158, and a third land 166 for blocking the pressure delivered through the fourth port 160 to the converter control valve.

The converter feed valve 18 has a first port 168 for receiving the hydraulic pressure from the seventh port 126 of the pressure regulation valve 8, a second port 170 for delivering the pressure of the first port to the converter control valve 24, and third port 172 for receiving the control pressure from the line part 23. The converter feed valve has additionally a bypass line part 174 to adjust the pressure of the first port 168 by means of the valve spool being moved. The converter control valve 24 has a first port 176 for receiving the drive pressure from the converter feed valve 18 applied to the torque converter 4, a second port 180 for delivering the pressure to a line part 178 to work the damper clutch of the torque converter 4, and a third port 184 for delivering the pressure to a line part 182 to release the damper clutch. Additionally, the converter control valve 24 has a fourth port 186 for receiving the control pressure from the fourth port 160 of the converter control pressure signal valve 32, and a fifth port 188 for receiving the control pressure from the line part 58 supplying the reverse drive pressure.

Figure 3:
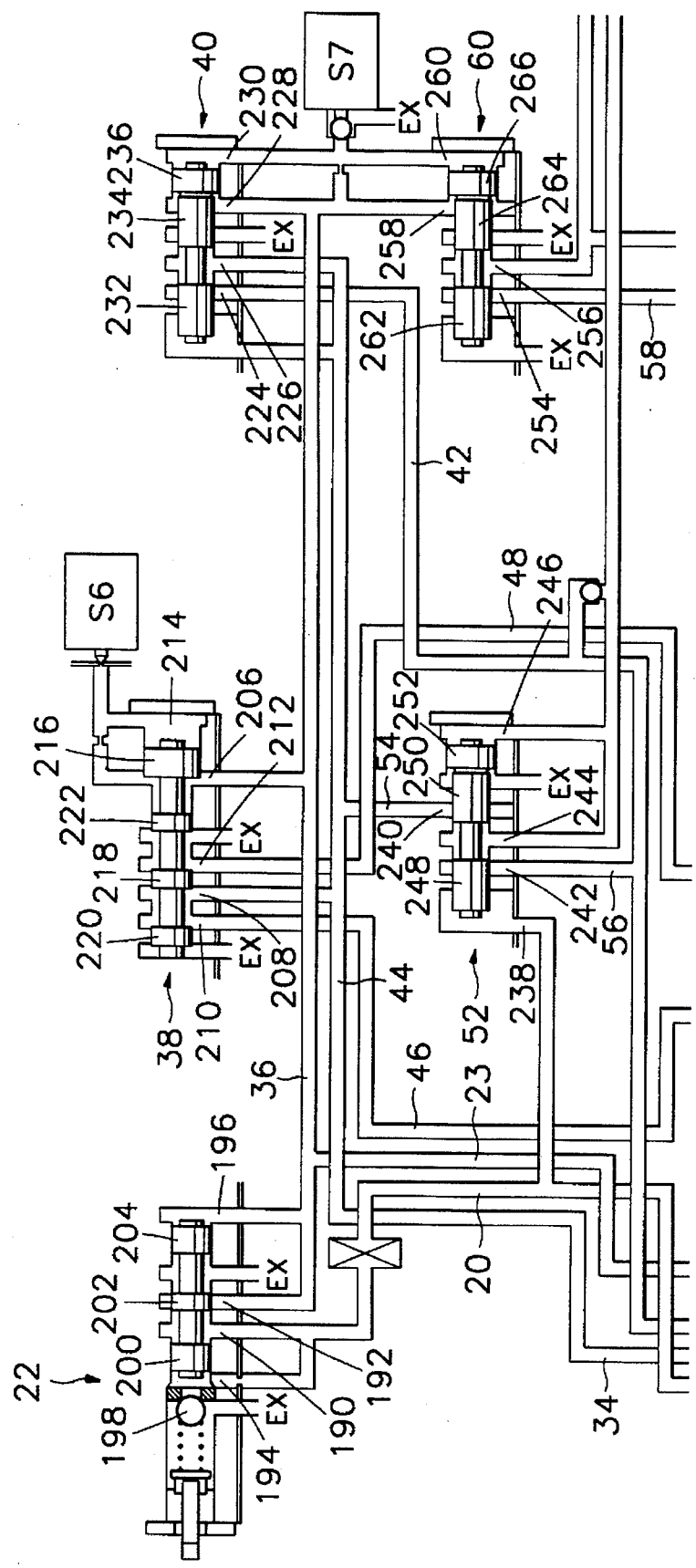
FIG. 3 is an enlarged circuit diagram for showing the shift pressure control means of FIG. 1.

Referring to FIG. 3, the solenoid supply valve 22, which receives the line pressure via the line part 20 from the pressure regulation valve 8, is to deliver the control pressure via the line parts 23, 36 to the solenoid valves S1, S2, S3, S4, S5, S6, S7, having a first port 190 for receiving the line pressure via the line part 23. Additionally provided is a second port 192 to deliver the pressure via the line part 36 to the control switch valve 38 and the torque control regulation valve 40. Also provided are a third port 194 to bypass a part of the pressure flowing into the first port 190 thus changing the position of the valve spool, and a fourth port 196 for receiving a part of the second port 192 to change the position of the valve spool. The pressure delivered through the third port 194 is to move a check ball 198 by overcoming the resilient force of the spring supporting the check ball to be discharged outside.

The valve spool of the solenoid supply valve 22 has a first land 200 with the left side receiving the pressure of the third port 194 and the right side receiving the pressure of the first port 190, a second land 202 for changing the opening size of the second port to adjust the pressure, and a third land 204 for receiving the pressure of the fourth port 196.

The control switch valve 38 has a first port 206 for receiving the pressure of the line part 36, and a second port 208 for receiving the torque pressure via the line part 44 from the torque control regulation valve 40. Additionally provided are a third and a fourth port 210 and 212 to respectively deliver the torque pressure via a first and a second torque pressure line part 46 and 48 to the first-to-second shift valve 50. The pressure flowing through the first port 206 is formed in or released from the pressure chamber 214 by means of the sixth solenoid valve S6 controlled on/off by the transmission control unit.

The valve spool has a first land 216 for receiving the pressure of the pressure chamber 214, and a second, a third and a fourth land 218, 220 and 222 with a pressure applied area smaller than that of the first land. The second land 218 moves left or right about the fourth port 212 to communicate with the second port 208 or not, and the third land 220 about the third port 210 to communicate with the second port 208 or not.

The torque control regulation valve 40, which is to produce the torque pressure required during shifting operation, has a first port 224 for receiving the drive pressure of the line part 42, a second port 226 for delivering the pressure to the line part 44, a third and a fourth port 228 and 230 for receiving the control pressure delivered via the line part 36 from the solenoid supply valve 22. The valve spool of the torque control regulation valve 40 has a first land 232 for selectively blocking the pressure of the first port 224, a second land 234 for closing the third port 228, and a third land 236 with the largest pressure applied area for receiving the pressure of the fourth port 230. The pressure delivered through the fourth port 230 is formed or released to move the valve spool by means of the seventh solenoid valve S7 controlled by the transmission control unit.

The line part 44 is provided with the N-D control valve 52 for reducing the shift shock produced when changing the shift mode from the neutral range to the forward drive range. The N-D control valve has a first port 238 for receiving the line pressure through the line part 20, a second port 240 for receiving the torque pressure from the line part 44, a third port 242 for receiving the drive pressure from the line part 56, and a fourth port 244 for delivering the pressure of the second or third port 240 or 242 to the first friction element C2. Additionally, a fifth port 246 is provided to receive a part of the pressure going through the fourth port 244.

The valve spool of the N-D control valve 52 has a first land 248 for blocking the third port 242 by the pressure applied through the first port 238, a second land 250 for closing the second port 240, and a third land 252 with the largest pressure applied area for receiving the pressure through the fifth port 246.

The reverse torque control regulation valve 60, which is to reduce the shifting shock when shifting from the neutral range to the reverse drive range, has a first port 254 for receiving the pressure from the line part 58 containing the reverse pressure, a second port 256 for delivering the pressure to the reverse friction element C4, and a third and a fourth port 258 and 260 for receiving the control pressure from the line part 36. The pressure applied through the fourth port 260 is formed or released to move the valve spool by means of the seventh solenoid valve S7.

The valve spool of the reverse torque control regulation valve 60 has a first land 262 for blocking the first port 254, a second land 264 for blocking an exit port Ex to discharge the pressure applied to the reverse friction element C4, and a third land 266 having the largest pressure applied area with the left side receiving the pressure of the third port 258 and the right side receiving the pressure of the fourth port 260.

Figure 4:
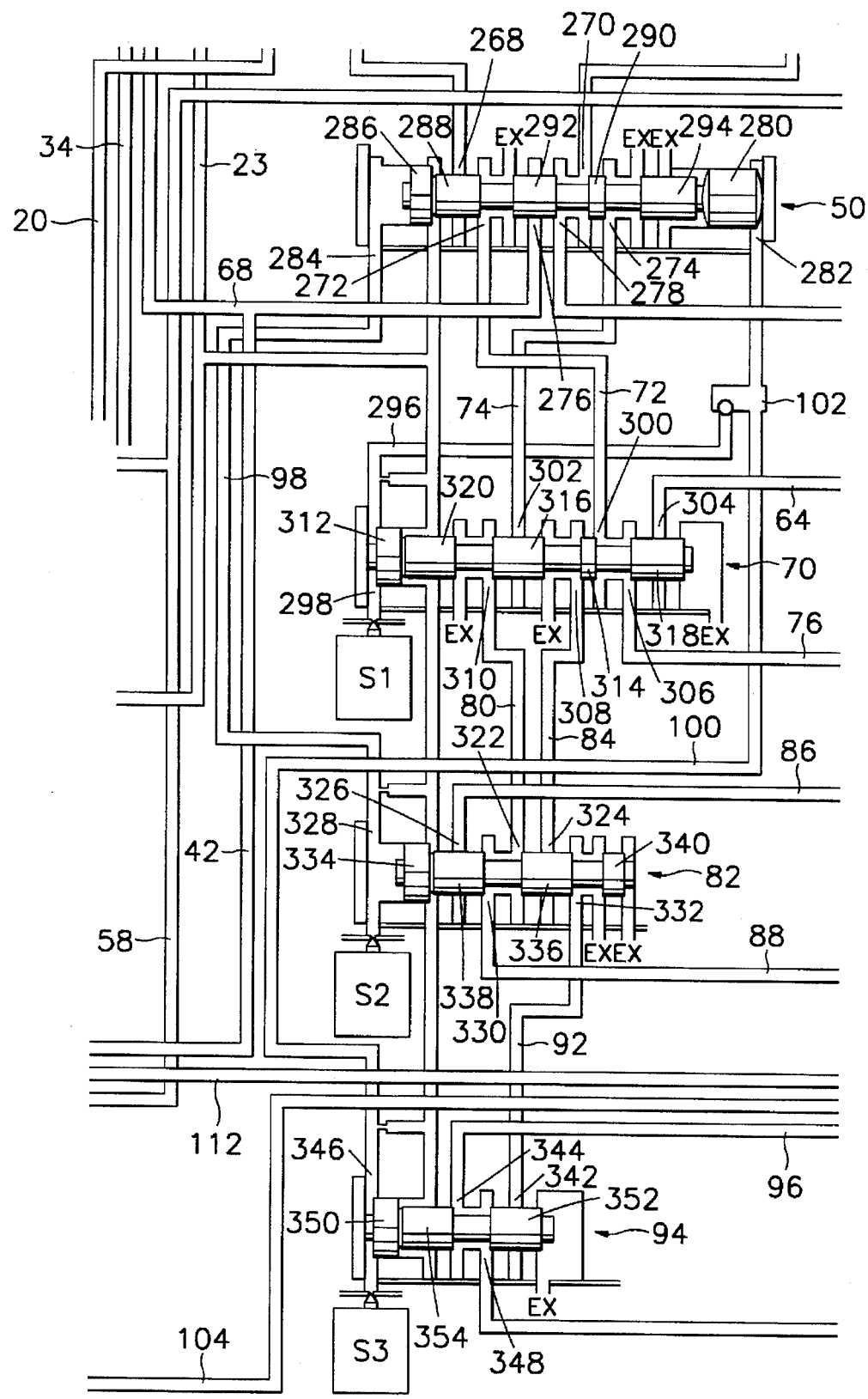
FIG. 4 is an enlarged circuit diagram for showing the first pressure distribution means of FIG. 1.

Referring to FIG. 4 for illustrating a first hydraulic pressure distribution means, the first-to-second shift valve 50, which receives the torque or drive pressure through the drive pressure branch line 68 connected through the line part 42 with the control switch valve 38, has a first port 268 for communicating with the first torque pressure line part 46, a second port 270 for communicating with the second torque pressure line part 48, a third port 272 for delivering the torque pressure of the first port 268 to the second-to-third shift valve 70 through the line part 72, a fourth port 274 for delivering the torque pressure of the second port 270 to the second-to-third shift valve 70 through the line part 74, a fifth port 276 for receiving the drive pressure through the line part 68, and a sixth port 278 for delivering the pressure of the fifth or second port 270 to the 2ND clutch valve 62.

The valve spool of the first-to-second shift valve 50 has six lands. The first land 280 is to receive the control pressure applied through a first control port 282. The second land 286 with the same pressure applied area as the first land is to receive the control pressure applied through a second control port 284. The third land 288 having the pressure applied area smaller than the first and second lands 280 and 286 selectively delivers the pressure of the first port 268 to the third port 272, and the fourth land 290 having the same pressure applied area as the third land delivers the pressure of the second port 270 to the fourth or sixth port 274 or 278. The fifth land 292 delivers the pressure of the fifth port 276 to the sixth port 278, and the sixth land 294 prevents the pressure received through the second port 270 from being discharged through exit ports Ex.

The second-to-third shift valve 70 is connected via a line part 296 with the first control port 282 of the first-to-second shift valve 50, having a control port 298 attached to the first solenoid valve S1. Also provided are a first port 300 for receiving the pressure of the line part 72, a second port 302 for receiving the pressure of the line part 74, a third port 304 for receiving the pressure from the 2ND clutch valve 62 via the line part 64, a fourth port 306 for delivering the pressure of the first port 300 to the 3RD clutch valve 78, a fifth port 308 for delivering the pressure of the first port 300 to the third-to-fourth shift valve 82, and a sixth port 310 for delivering the pressure of the second port 302 to the third-to-fourth valve 82.

The valve spool of the second-to-third shift valve 70 has a first land 312 with the largest pressure applied area for receiving the pressure of the control port 298, a second land 314 for selectively delivering the pressure of the first port 300 to the fourth or fifth port 306 or 308, a third land 316 for delivering or blocking the pressure of the second port 302 to the sixth port 310, a fourth land 318 for closing the third port 304, and a fifth land 320 provided between the first and second lands 312 and 316 for closing an exit port Ex.

The third-to-fourth shift valve 82, which receives the pressure of the line parts 80 and 84 from the second-to-third shift valve 70, has a first port 322 for communicating with the line part 80, a second port 324 for communicating with the line part 84, a third port 326 for receiving the pressure delivered via the line part 86 from the 3RD clutch valve 78, a control port 328 for communicating with the second control port 284 of the first-to-second shift valve 50 via a control line part 98 to form or release the pressure by means of the second solenoid valve S2, a fourth port 330 for delivering the pressure of the first port 322 to the 4TH band valve 90 via the line part 88, a fifth port 332 for delivering the pressure of the second port 324 to the fourth-to-fifth shift valve 94.

The valve spool of the third-to-fourth shift valve 82 has a first land 334 with the largest pressure applied area for receiving the pressure of the control port 328, a second land 336 for closing the first port 322 to block the pressure to the fourth port 330, a third land 338 for blocking the pressure flow between the third and fourth ports 326 and 330, and a fourth land 340 for closing an exit port Ex.

The fourth-to-fifth shift valve 94, which receives the pressure delivered from the third-to-fourth shift valve 82 via the line part 92, a second port 344 for receiving the pressure delivered from the 4TH band valve 90 via the line part 96, a control port 346 for communicating with the first control port 282 of the first-to-second shift valve 50 via the line part 100 to form or release the pressure by means of the third solenoid valve S3, and a third port 348 for delivering the pressure of the first port 342 to the overdrive unit valve 59.

The valve spool of the fourth-to-fifth shift valve has a first land 350 with the largest pressure applied area for receiving the pressure of the control port 346, a second land 352 for closing the first port 342, and a third land 354 for closing the second port 344.

Figure 5:
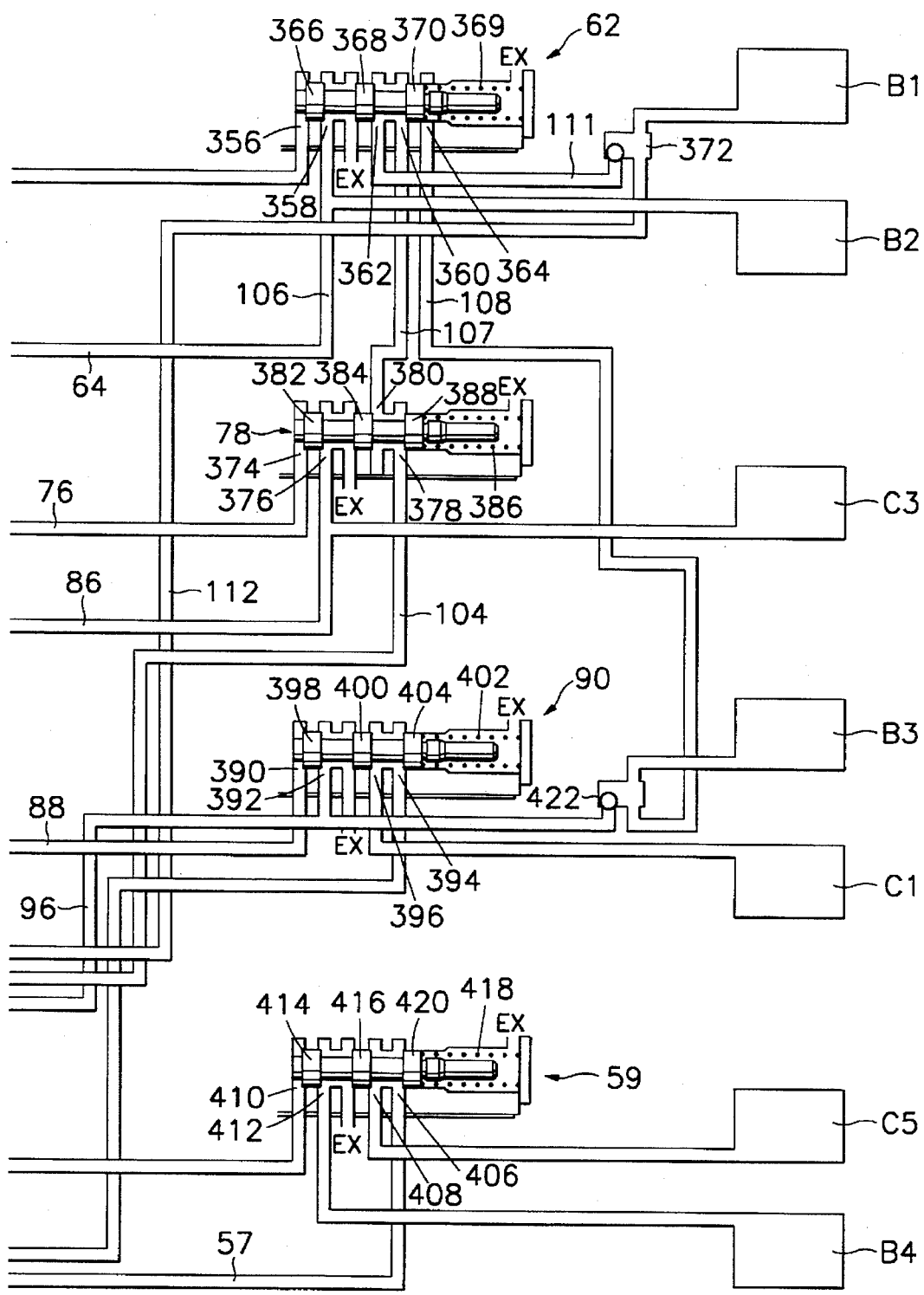
FIG. 5 is an enlarged circuit diagram for showing the second pressure distribution means of FIG. 1.

Referring to FIG. 5 for illustrating a second hydraulic distribution means, the 2ND clutch valve 62, which receives the hydraulic pressure form the first-to-second shift valve 50, has a first port 356 for receiving the torque pressure or the drive pressure, a second port 358 for delivering the pressure of the first port to third friction element B2 and the second-to-third shift valve 70, a third port 360 for receiving the second speed pressure delivered from the 3RD clutch valve 78 via the second speed pressure 104 in the forward drive range "2", and a fourth port 362 for delivering the second speed pressure of the third port to the reverse friction element B1 on the shifting control to the first speed, and a fifth port 364 for delivering the second speed pressure to the fifth friction element B3 on the shifting control to the second speed.

The valve spool of the 2ND clutch valve has a first land 366 for receiving the pressure of the first port 356, a second land 368 for closing the third and fourth ports 362, and a third land 370 supported by a spring 369 for closing the third and fifth ports 360 and 364.

The line part 112 for delivering the pressure to the reverse friction element B1 is provided with a shuttle valve 372 to cause the pressure of the line part 112 to be delivered in the reverse drive range and the pressure of the line part 111 in the forward drive range "2".

The 3RD clutch valve 78 has a first port 374 for receiving the pressure delivered from the third port 306 of the second-to-third shift valve 70 via the line part 76, a second port 376 for delivering the pressure of the first port to the fourth friction element C3 and the third-to-fourth shift valve 82, a third port 378 for receiving the pressure of the line part 104, and a fourth port 380 for delivering the pressure of the third port to the 2ND clutch valve 62 via the line part 107.

The valve spool of the 3RD clutch valve has a first land 382 for receiving the pressure of the first port 374, a second land 384 for blocking the flow passage connecting the third and fourth ports 378 and 380, and a third land 388 resiliently supported by a spring 386 to counteract the pressure of the first port 374.

The fourth band valve 90 has a first port 390 for receiving the pressure delivered from the third-to-fourth shift valve 82 via the line part 88, a second port 392 for delivering the pressure to the fifth friction element B3 and the fourth-to-fifth shift valve 94, a third port 394 for receiving the pressure of the third speed pressure line 110 in the third forward speed range "3", and a fourth port 396 for delivering the pressure of the third port to the seventh friction element C1.

The valve spool of the fourth band valve 90 has a first land 398 for opening the second port 392 under the pressure of the first port 390, a second land 400 for connecting the pressure of the third port 394 with the fourth port 396, and a third land 404 resiliently supported by a spring 402.

The overdrive unit valve 59 for delivering the hydraulic pressure to the second friction element C5 working through all the first to fourth forward speeds has a first port 406 for receiving the pressure delivered from the manual valve via the line part 57, a second port 408 for delivering the pressure of the first port to the second friction element, a third port 410 for receiving the pressure from the third port 348 of the fourth-to-fifth shift valve 94, and a fourth port 412 for delivering the pressure of the third port to the sixth friction element B4.

The valve spool of the overdrive unit valve has a first land 414 for receiving the pressure of the third port 410 to open the fourth port 412, a second land 416 for controlling the flow passage between the first port 406 and the second port 408, and a third land 420 resiliently supported by a spring 418.

In addition, the line part 108 is provided with a shuttle valve 422 to deliver the pressure to the fifth friction element B3 in the fourth and second forward speed range.

In operation, changing the position of the shifting lever from the neutral position to the drive range D, the transmission control unit controls the first and third solenoid valve S1 and S3 on and the second solenoid valve S2 off. Meanwhile, the hydraulic pressure produced by the oil pump 2 is delivered through the first and second ports 114 and 116 of the pressure regulation valve 8 to the manual valve 12, and then through the line part 42 to the first-to-second shift valve 50, the N-D valve 52 and the torque control regulator valve 40. In this case, a part of the hydraulic pressure produced by the oil pump 2 is also delivered via the line 20 to the solenoid supply valve 22. On the other hand, the hydraulic pressure is delivered from the manual valve 12 through the line part 57 to the second friction element C5.

When the pressure of the line part 20 flows into the first port 238 of the N-D valve 52 moving the valve spool to the right side, the second and fourth ports 240 and 244 communicate, but the third port 242 is disconnected from the fourth port 244. Hence, the pressure of the third port 242 is blocked, but the torque pressure received through the second port 240 is delivered to the first friction element C2 through the fourth port 244. This torque pressure comes from the torque control regulation valve 40 by controlling the seventh solenoid valve S7 off, which controlling moves the valve spool of the torque control regulation valve 40 to the left side causing the pressure of the first port 224 to flow out through the second port 226 delivered through the line part 44 to the torque pressure branch line 54.

Figure 6:
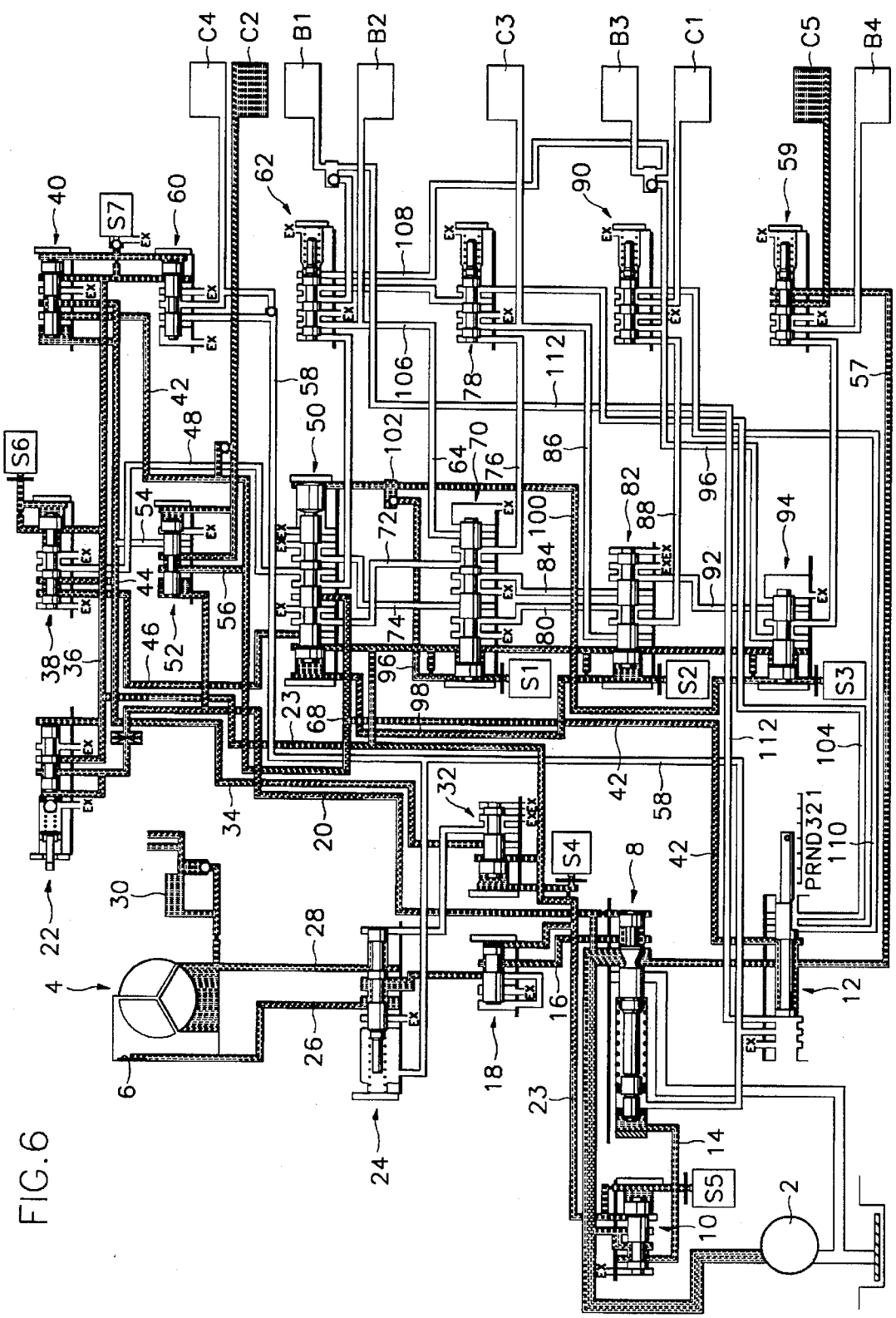
FIG. 6 is a diagram similar to FIG. 1 for illustrating the first forward speed control according the present invention.

Then, the second friction element C5 is worked by the line pressure, and the first friction element C2 by the torque pressure, thus carrying the first speed control, when a part of the hydraulic pressure flowing out of the fourth port 244 of the N-D is delivered to the third land 252 through the fifth port 246. Hence, the valve spool of the N-D valve 52 is moved to the left side, so that the drive pressure of the third port 242 is delivered to the first friction element C2 completing the first speed control, as shown in FIG. 6.

Meanwhile, the pressure of the line part 44 flows into the second port 208 of the control switch valve 38, whose valve spool is moved to the right side because of the sixth solenoid valve S6 being turned on, thus making the second port 208 communicate with the fourth port 212. The pressure of the fourth port is delivered to the second port 270 of the first-to-second shift valve 50 through the line part 48. In this case, because the solenoid valve S3 is turned on to provide the second control port 284 with the hydraulic pressure, the valve spool is moved to the right side by the pressure applied to the left side of the second land 286, as shown in FIG. 6. Thus, the second and sixth ports 270 and 278 of the first-to-second shift valve 50 communicate to make the pressure of the second torque pressure line 48 flow into the first port 356 of the 2ND clutch valve 62, so that the valve spool of the 2ND clutch valve 62 is moved to the right side to deliver the pressure to the third friction element B2 through the second port 358.

Additionally, a part of the pressure delivered to the third friction element B2 is delivered via the line part 64 to the third port 304 of the second-to-third shift valve 70. In this case, because the first solenoid valve S1 is turned on, the valve spool of the second-to-third shift valve is moved to the left side so as to keep the pressure in the third port 304.

Figure 7:
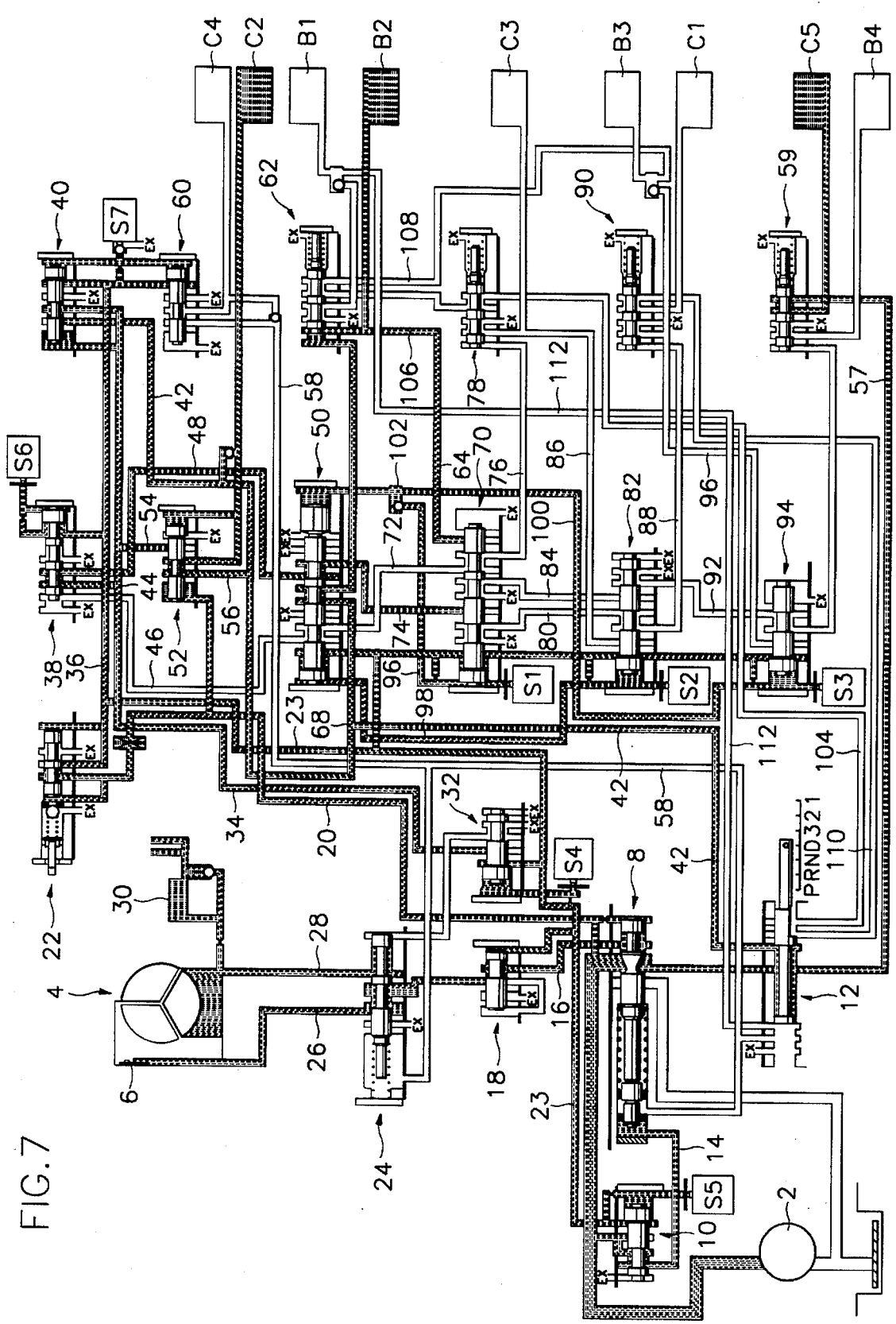
FIG. 7 is a diagram similar to FIG. 1 for illustrating the second forward speed control according the present invention.

When the third solenoid valve S3 is turned off, the first-to-second shift valve 50 has the first control port 282 supplied with the pressure moving the valve spool to the left side, so that the pressure delivered through the second port 270 of the first-to-second shift valve 50 is delivered through the fourth port 274 to the line part 74, and the fifth and sixth ports 276 and 278 communicate to deliver the drive pressure to the third friction element B2 completing the second speed shift control, as shown in FIG. 7.

Further increasing the vehicle speed from the second speed, the transmission control unit controls the sixth solenoid valve S6 off to make the first torque pressure line part 46 supplied with the torque pressure. In this case, since the valve spool of the first-to-second shift valve 50 is moved to the left side, the torque pressure is delivered to the first port 300 of the second-to-third shift valve 70 through the first and third ports 268 and 272. The first solenoid valve S1 is turned on so as to move the valve spool of the second-to-third shift valve 70 to the left, thus making the first port 300 communicate with the fourth port 306. Hence, the torque pressure of the fourth port 306 flows through the line port 76 into the first port 374 of the 3RD clutch valve 78, thus moving the valve spool to the right side. The torque pressure flowing into the first port 374 is delivered to the fourth friction element C3 through the second port 376, and partly to the third port 326 of the third-to-fourth shift valve 82 through the line part 86.

Figure 8:
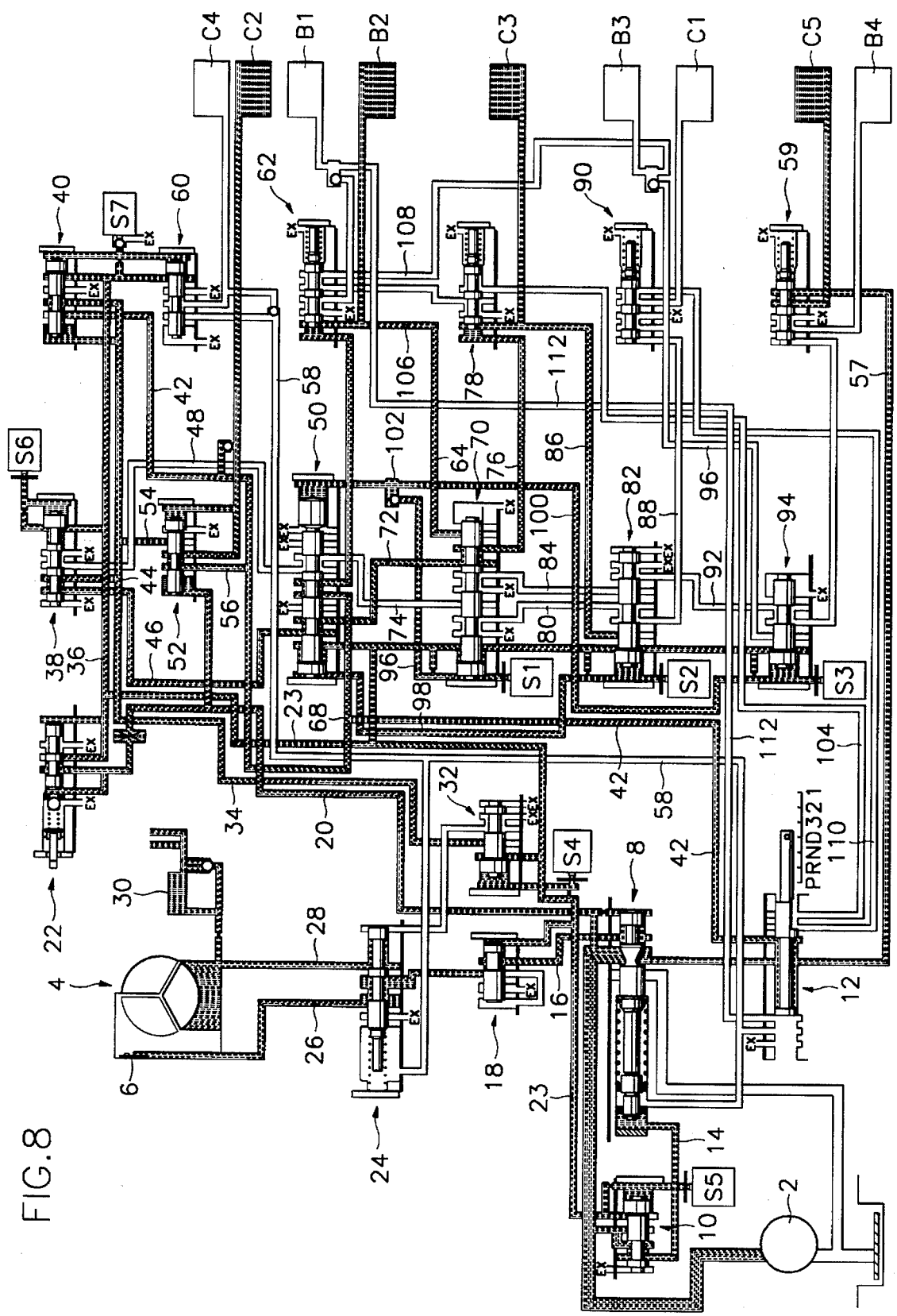
FIG. 8 is a diagram similar to FIG. 1 for illustrating the third forward speed control according to the present invention.

Since the second solenoid valve S2 is controlled off, the third-to-fourth shift valve 82 carries out the third speed control with the torque pressure maintained in the third port 326. Controlling the first solenoid valve S1 off causes the valve spool to be moved to the right side, so that the first and fourth ports 300 and 306 of the second-to-third shift valve 70 are blocked with the third and fourth ports 304 and 306 communicating to apply the drive pressure to the fourth friction element C3, thereby completing the third speed control, as shown in FIG. 8.

More increasing the vehicle speed in the third speed control, the transmission control unit controls the sixth solenoid valve S6 to move the valve spool of the control switch valve 38 to the right side, so that the torque pressure flowing into the second port 208 is delivered through the second torque pressure line 48 to the second port 270 of the first-to-second shift valve 50, whose fourth port 274 in turn delivers the pressure to the second port 302 of the second-to-third shift valve 70. Since the first solenoid valve S1 is turned off, the valve spool of the second-to-third shift valve 70 is positioned so as to cause the torque pressure received through the second port 302 to flow from the sixth port 310 to the first port 322 of the third-to-fourth shift valve 82 through the line part 80.

Figure 9:
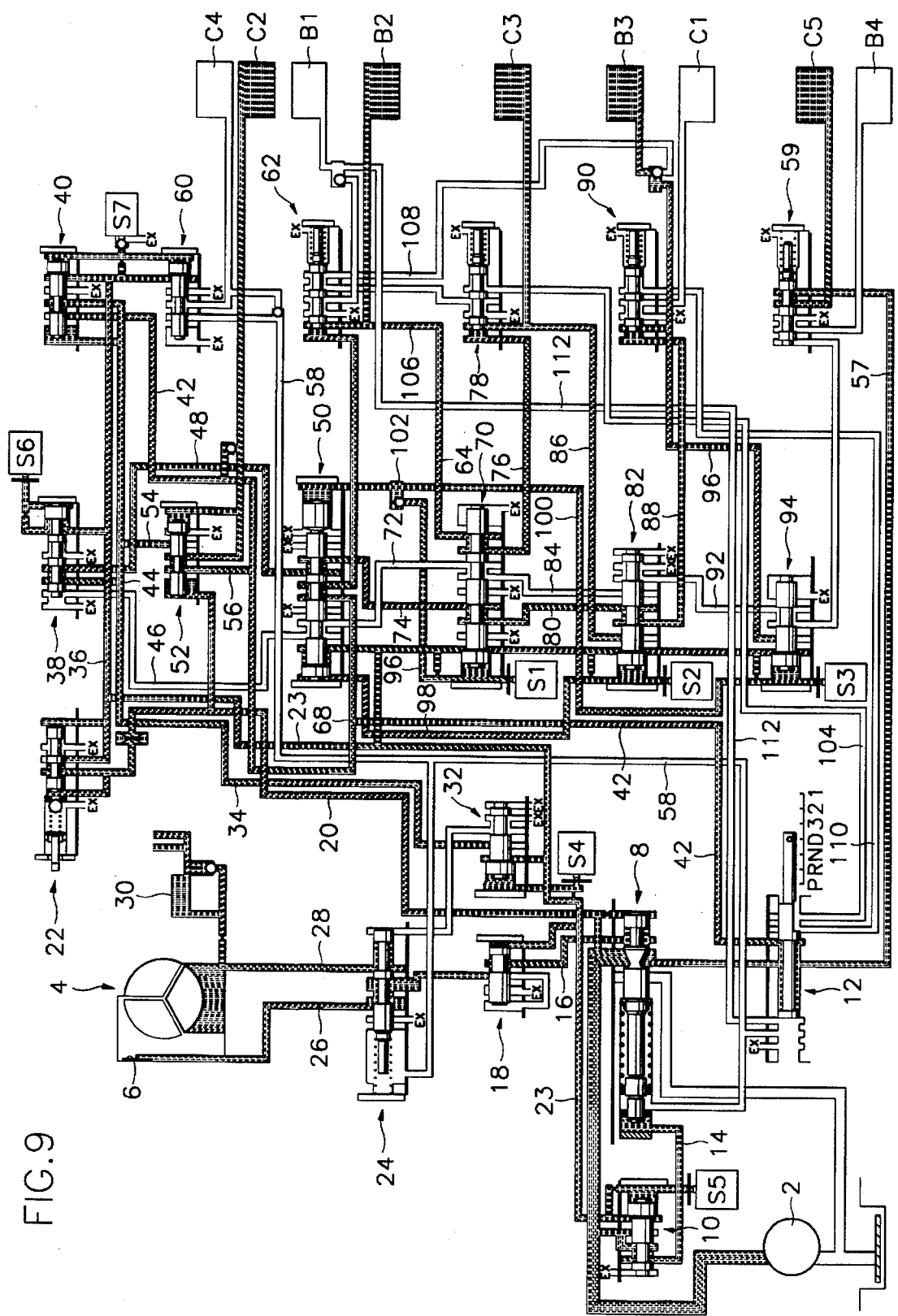
FIG. 9 is a diagram similar to FIG. 1 for illustrating the fourth forward speed control according to the present invention.

The torque pressure applied to the first port 32 of the third-to-fourth shift valve flows out through the fourth port 330 delivered to the first port 390 of the fourth band valve 90 through the line part 88 with the valve spool moved to the right side. Then, the valve spool of the fourth band valve 90 is moved to the left side, so that the pressure received through the first port flows out through the second port 392 to work the fifth friction element B3, and partly to the second port 344 of the fourth-to-fifth shift valve 94 through the line part 96. In this cases, the transmission control unit controls the second solenoid valve S2 on so as to move the valve spool of the third-to-fourth shift valve 82 to the left side. Hence, the first and fourth ports 322 and 330 of the third-to-fourth shift valve 82 are blocked with the third and fourth ports 326 and 330 communicating. Meanwhile, the drive pressure to have worked the fourth friction element C3 in the third speed is kept in the third port 326 of the third-to-fourth shift valve 82, the port change causes the fifth friction element B3 to be supplied with the drive pressure completing the fourth speed control, as shown in FIG. 9.

More increasing the vehicle speed causes the transmission control unit to again control the sixth solenoid valve S6 off, making the torque pressure of the line part 44 flow through the first torque pressure line 46 to the first port 268 of the first-to-second shift valve 50 whose valve spool is moved to the left side. Then, the pressure in turn is delivered to the first port 300 of the second-to-third shift valve 70 through the line part 72. Since the valve spool of the second-to-third shift valve 70 is moved to the right side, the pressure is delivered to the second port 324 of the third-to-fourth shift valve 82 through the fifth port 308.

At this time, since the valve spool of the third-to-fourth shift valve 82 is positioned in the left side, the torque pressure received through the second port 324 is delivered through the fifth port 332 to the line part 92 to the first port 342 of the fourth-to-fifth shift valve 94. The torque pressure received through the first port 342 is delivered to the third port 410 of the overdrive unit valve 59 through the third port 348 because of the third solenoid valve S3 turned off by the transmission control unit. The torque pressure through the third port 410 overcomes the resilient force of the spring 418 to move the valve spool to the right side.

Figure 10:
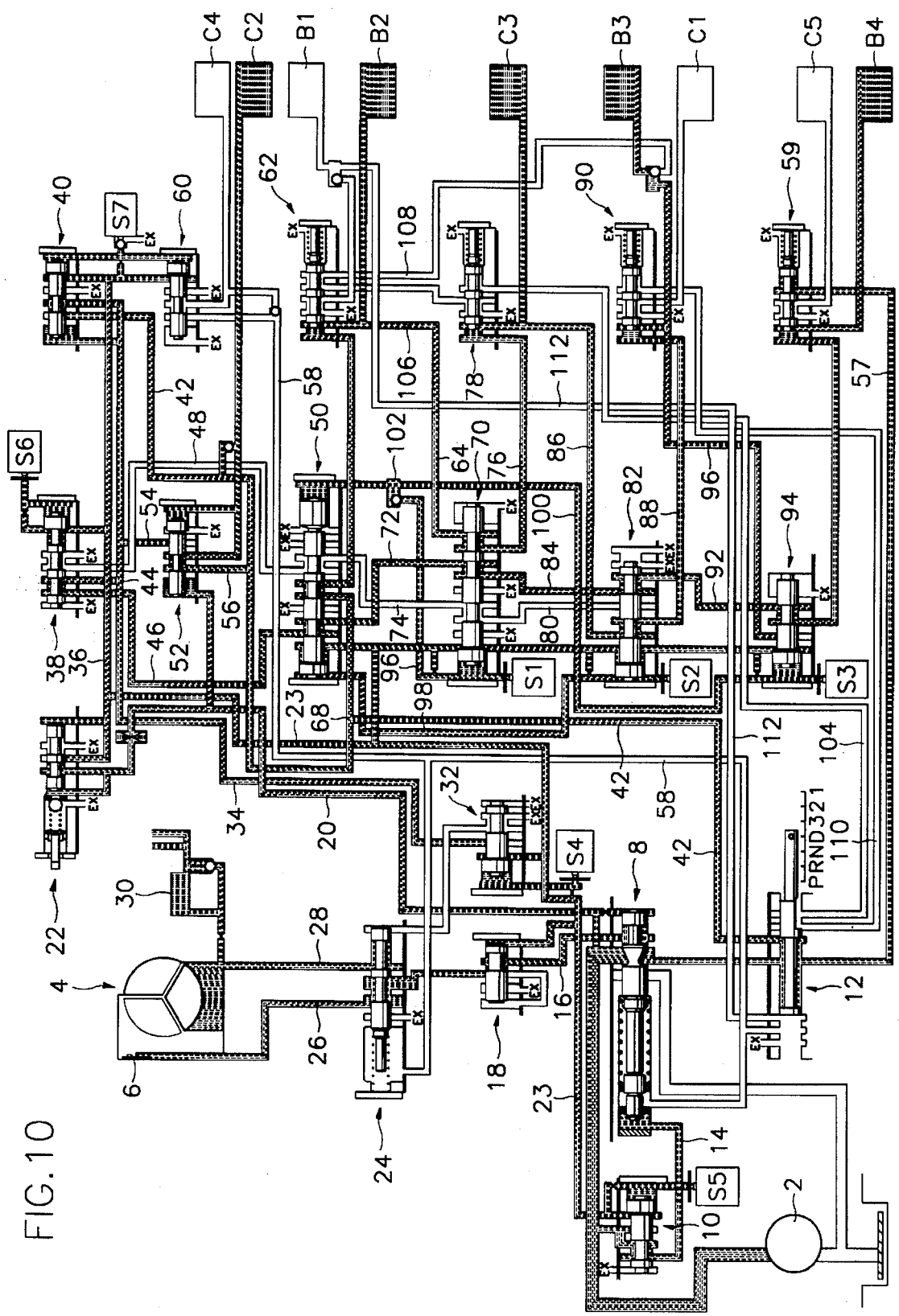
FIG. 10 is a diagram similar to FIG. 1 for illustrating the fifth forward speed control according to the present invention.

Thus, the torque pressure flowing into the third port 410 is delivered to the sixth friction element B4 through the fourth port 412 starting the fifth speed control. This blocks the pressure to have worked the second friction element C2 through the first and second ports 406 and 408. Then, the transmission control unit turns on the third solenoid valve S3 to block the first and third ports 342 and 348 of the fourth-to-fifth shift valve 94, making the second and third ports 344 and 348 communicate. Meanwhile, a part of the drive pressure, which has been working the fifth friction element B3 in the fourth speed, is kept working the sixth friction element B4 to complete the fifth speed control, as shown in FIG. 10.

Figure 11:
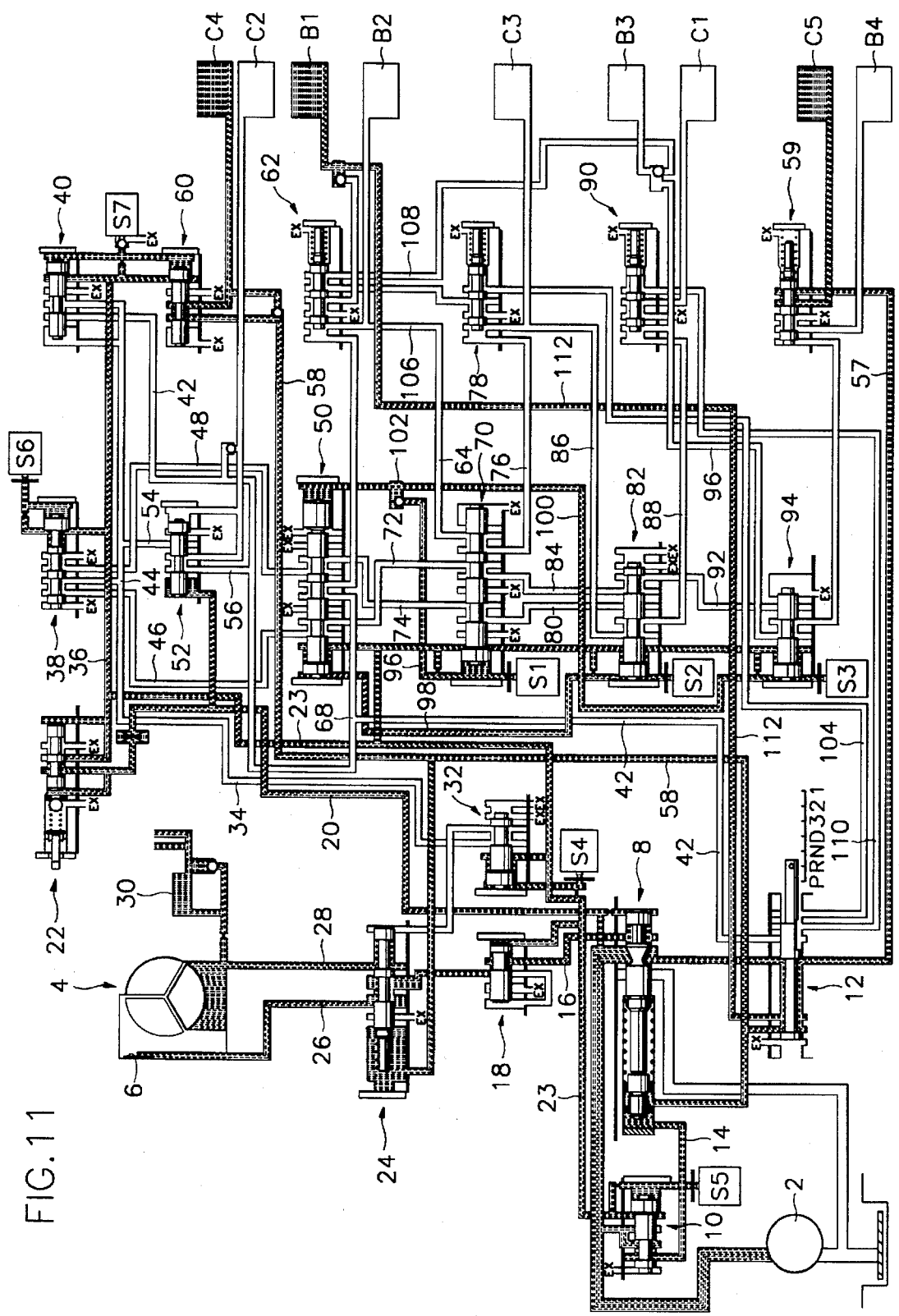
FIG. 11 is a diagram similar to FIG. 1 for illustrating the reverse drive control according to the present invention.

Referring to FIG. 11, changing the position of the shifting lever to the reverse range, the pressure of the manual valve 12 is delivered to the first port 406 of the overdrive unit valve 59 through the line part 57, then transferred to the second friction element C5 through the second port 408. In addition, the pressure of the manual valve 12 is also delivered to the shuttle valve 372 through the reverse pressure line 112, thus working the reverse friction element B1.

At this time, the pressure flows through the line part 58 into the first port 254 of the reverse torque control regulator valve 60, and the seventh solenoid valve S7 is turned off, thereby moving the valve spool of the reverse torque control regulator valve 60 to the left side. Hence, the first and second ports 254 and 256 communicate causing the pressure of the first port 254 to work the reverse friction element C4. Namely, the hydraulic pressure supplied to the manual valve 12 in the neutral range flows through the reverse pressure line 112 to work the reverse friction element B1, and through the line part 57 to work the second friction element C5. Thus, changing the mode from the neutral range N to the reverse range R makes the reverse friction element B1 keep on the operation, facilitating the reverse control.

When the shifting indicates the third speed range "3", the same shifting control is carried out as the other ranges with the exception of the pressure being supplied through the third speed pressure line 110 to the third and fourth port 394 and 396 to additionally work the seventh friction element C1. Changing the mode to the second speed range "2", the friction element control is carried out in the same way as the first speed control of the "D" range, and in addition through the second speed pressure line 104 and third speed line 110 works the seventh friction element C1 and the reverse friction element B1. Namely, in the second speed of the "2" range are worked the first, second and third friction elements C2, B2 and C5 together with the fifth and seventh friction elements B3 and C1.

Meanwhile, the converter control pressure signal valve 32 of the damper clutch working control means has the valve spool moved leftward and rightward by the turning on/off of the fourth solenoid valve S4. This causes a part of the pressure of the line part 44 of the torque control regulation valve 40 to flow into the third port 158 of the converter control pressure signal valve 32 delivered or blocked to the fourth port 186 of the converter control valve 24 through the fourth port 160.

The fourth solenoid valve S4 is controlled on in the working region of the damper clutch to move the valve spool of the converter control pressure signal valve 32 to the left side, so that the pressure of the third port 158 is applied to the fourth port 186 of the converter control valve 24 through the fourth port 160. Thus, the pressure flowing into the fourth port 186 causes the valve spool of the converter control valve 24 to move towards the left side, so that the pressure delivered from the pressure control valve 8 to the converter feed valve 18 is supplied to the torque converter 4 through the first and second ports 176 and 178 to work the damper clutch 6. On the contrary, in the non-operating region of the damper clutch is controlled the fourth solenoid valve S4 off, so that the pressure flowing into the first port 176 of the converter control valve 24 is transferred to the third port 184 to release the damper clutch.

The inventive system makes it possible to adjust the line pressure by means of the fifth solenoid valve S5 that is turned on/off according to the amount of the throttle opening of the intake manifold system. For example, in a low throttle interval is controlled the fifth solenoid valve S5 on to discharge through the high line signal pressure valve 10 the pressure delivered from the solenoid supply valve 22 through the line part 23. Then the high line signal pressure valve 10 has the valve spool moved to the right side by the pressure of the first port 140, which causes the third land 152 to block the fourth port 146 preventing the pressure from flowing into the line part 14. Hence, the pressure delivered to the sixth port 124 of the pressure regulation valve 8 moves the valve spool to the left side, thus discharging the pressure produced from the oil pump through the third port 118.

Such line pressure discharge serves to improve the fuel consumption rate, where a high throttle interval turns the fifth solenoid valve S5 off so as to make the pressure flowing into the first port 140 of the high line signal pressure valve 10 push the valve spool at the right side of the first land 148. Hence, the second port 142 communicates with the fourth port 146 so as to make the pressure flow through the line part 14 into the fourth port 120 of the pressure regulation valve 8. The pressure of the fourth port 120 is delivered to the fourth land 134 to move the valve spool to the right side, so that the opening amount of the third port 118 is gradually decreased to reduce the discharging amount of the pressure. This increases the control pressure, where the fifth solenoid valve S5 is controlled off to increase the line pressure, and the seventh solenoid valve S7 is subjected to the duty control to control the pressure supplied to the friction elements.

Thus, the line pressure is stabilized as well as reducing the shifting shocks when changing the mode from the neutral to the forward or reverse drive.

What is claimed is:

1. A hydraulic control system of an automatic transmission used in a vehicle, comprising:

a torque converter for transferring the engine power to the input shaft of said transmission;

an oil pump for pumping an oil by means of said engine power;

a pressure regulation means for regulating the line pressure produced by said oil pump according to the forward and reverse drive and the amount of a throttle opening;

a damper clutch working control means for changing the direction of the pressure delivered to said torque converter in order to increase the power transfer rate of said torque converter;

a shift pressure control means for delivering the pressure supplied from said pressure regulation means to the first, second, third, fourth, fifth, sixth and seventh solenoid valves controlled on/off by a transmission control unit to adjust the control pressure during shifting operation; and a pressure distribution means for selectively distributing the pressure supplied from said pressure control means during shifting among the friction elements according to the shifting stages.

2. A hydraulic control system as defined in claim 1, wherein said pressure regulation means comprises:

a pressure regulation valve having a first port for receiving the hydraulic pressure from the oil pump, a second port for delivering the regulated pressure to a manual valve, a third port for discharging the pressure received through said first port for pressure regulation, a fourth port for forming or releasing the pressure according to the amount of the throttle opening on the forward drive, a fifth port for receiving a reverse drive pressure, a sixth port for delivering a pressure in opposition to the pressures supplied through said fourth and fifth ports, and a seventh port for delivering the regulated pressure to said damper clutch operation control means; and a high line signal pressure valve having a first port for receiving the pressure of said pressure control means, a second port for receiving the line pressure, a third port for forming or releasing the pressure under the control of the fifth solenoid valve, and a fourth port for delivering a control pressure to the fourth port of said pressure regulation valve.

3. A hydraulic control system as defined in claim 1, wherein said damper clutch control means comprises:

a converter control pressure signal valve having a first port for receiving the pressure of said pressure control means when carrying out the shifting operation, a second port for forming or releasing the pressure by means of the fourth solenoid valve turned on/off in the region of the damper clutch operation/non-operation, a third port for receiving the control pressure of the damper clutch, and a fourth port for delivering or blocking said control pressure; and a converter control valve having a first port for receiving the damper clutch working or releasing pressure, a second port for delivering the pressure of said first port to the line part of the damper clutch working side, a third port for delivering the pressure of said first port to the line part of the damper clutch releasing side, and a fourth port for receiving the control pressure from said converter control pressure signal valve.

4. A hydraulic control system as defined in claim 1, wherein said shift pressure control means comprises and N-D valve for delivering to the friction elements the torque pressure subject to the duty control by the seventh solenoid valve on changing the mode from the neutral range to the forward range, and a reverse torque control valve subject to the duty control by said seventh solenoid valve on changing the mode from the neutral range to the reverse range.

5. A hydraulic control system as defined in claim 1, wherein said pressure distribution means comprises a plurality of shift valves each having two ports for selectively receiving one of two kinds of torque pressure from said shift pressure control means, and a port for receiving a drive pressure, and a port for sequentially delivering said drive pressure and the torque pressure flowing into one of said two ports for receiving said torque pressures.

6. A hydraulic control system as defined in claim 4, wherein said N-D valve have a port for receiving said torque pressure, a port for sequentially delivering said torque pressure and said drive pressure to said friction elements, and a line pressure port for controlling the valve spool so as to make said torque and drive pressures be sequentially delivered.

7. A hydraulic control system as defined in claim 5, wherein said plurality of shift valves include a first-to-second shift valve, a second-to-third shift valve, a third-to-fourth shift valve, and a fourth-to-fifth shift valve, said first-to-second and second-to-third shift valve making a port change to replace said torque pressure by said drive pressure on said first solenoid valve being turned off, said third-to-fourth shift valve making a port change to replace said torque pressure by said drive pressure on said second solenoid valve being turned on, and said fourth-to-fifth shift valve making a port change to replace said torque pressure by said drive pressure on said third solenoid valve be turned on.

8. A hydraulic control system as defined in claim 7, wherein said first-to-second shift valve has a valve spool with a first and a second land at both ends, said first and second lands having a pressure applied area greater than any other lands.

9. A hydraulic control system as defined in claim 7, wherein said shift valves respectively communicate with a 2ND clutch valve, a 3RD clutch valve, a fourth band valve, and a overdrive unit valve.

10. A hydraulic control system as defined in claim 2, wherein said pressure regulation valve has a first port for receiving the line pressure from said oil pump, a second port for discharging said line pressure, a third port for receiving a control pressure from said high line signal pressure valve means during a forward drive, a fourth port for receiving the reverse drive pressure as the control pressure during the reverse drive, a fifth port for delivering the regulated line pressure to said manual valve, a sixth port for delivering the regulated line pressure to the converter feed valve, and a seventh port for making use of the regulated line pressure as the control pressure.

11. A hydraulic control system as defined in claim 2, wherein said high line signal pressure valve includes a first and a second port for receiving the control signal supplied from a solenoid supply valve, a third port for receiving the line pressure supplied from said oil pump, and a fourth port for delivering the line pressure of said third port as the control pressure of said pressure regulation valve.

12. A hydraulic control system as defined in claim 3, wherein said converter control pressure signal valve a first port for forming or releasing a pressure by means of a solenoid valve, a second port for continuously maintaining a pressure, a third port for receiving the torque pressure, and a fourth port for delivering said torque pressure as the control pressure.

13. A hydraulic control system as defined in claim 3, wherein said converter control valve is connected with said manual valve and line parts so as to receive the reverse drive pressure as the control pressure during the reverse drive.

* * * * *

UNITED STATES PATENT AND TRADEMARK OFFICE
CERTIFICATE OF CORRECTION

PATENT NO. : 5,658,,218
DATED : August 19, 1997
INVENTOR(S) : Jaeduk JANG
Kibeen LIM It is certified that error appears in the above-indentified patent and that said Letters Patent is hereby corrected as shown below:

Claim 4,

Column 15, line 28, change "comprises and" to --comprises an--.

Signed and Sealed this

Fourteenth Day of October, 1997

Attest:

BRUCE LEHMAN

Attesting Officer

Commissioner of Patents and Trademarks